Sept. 3, 1968 P. C. DAHAN 3,399,645
TANKER CONSTRUCTION
Filed April 17, 1967 3 Sheets-Sheet 1

INVENTOR.
Paul C. Dahan
BY
*James F. Powers*
Attorney

Sept. 3, 1968　　　　P. C. DAHAN　　　　3,399,645
TANKER CONSTRUCTION

Filed April 17, 1967　　　　　　　　　　　　3 Sheets-Sheet 3

INVENTOR.
Paul C. Dahan
BY James F. Powers
Attorney

United States Patent Office 3,399,645
Patented Sept. 3, 1968

3,399,645
TANKER CONSTRUCTION
Paul C. Dahan, Pittstown, N.J., assignor to Mobil Oil
Corporation, a corporation of New York
Filed Apr. 17, 1967, Ser. No. 631,398
5 Claims. (Cl. 114—74)

ABSTRACT OF THE DISCLOSURE

A tanker comprising cargo tanks formed above bottom ballast tanks and a tunnel along the keel for housing the main cargo piping. Piping is provided to interconnect the bottom of each cargo tank and the main cargo piping in the tunnel.

BACKGROUND OF THE INVENTION

Field of the invention

This invention relates to an improved tanker construction. More particularly, it relates to a tanker bottom construction to minimize the possibility of damage to the cargo tanks in the event that the tanker bottom is damaged. Still more particularly, it relates to an arrangement of a tanker's cargo tanks and cargo piping to provide complete discharge of the cargo tanks.

Description of the prior art

A problem in the tanker art is that damage to the tanker's bottom may readily cause leakage of the cargo. In addition to loss of cargo, such leakage may pollute fishing areas and coast lines, and endanger shipping lanes. For example, U.S. Patents Nos. 1,699,709 and 2,979,009 disclose using the lower portion of the hull as the bottom of cargo tanks. If this portion of the hull were pierced, the tank cargo would flow into the surrounding water.

Removal of cargo, such as crude oil, from a tanker presents a further problem of completely discharging the cargo and settled solids and other sediments from the cargo tanks. For example, each of the above mentioned patents discloses a tanker having a tunnel along the keel for housing the main cargo piping and branch cargo piping to interconnect the cargo tanks and the main cargo piping. However, the branch cargo piping of each patent extends through a longitudinal bulkhead of each cargo tank to provide liquid communication near the bottoms of the cargo tanks. Thus, the patents do not provide for complete discharge of the cargo or for discharge of settled solids and other sediments.

SUMMARY OF THE INVENTION

In accordance with the present invention there is provided a tanker having an innerbottom spaced from the bottom of the tanker's hull to provide a space above the bottom of the hull. Imperforated transverse and longitudinal bulkheads form cargo tanks above the innerbottom. By providing the space below the cargo tanks, the possibility of rupturing the cargo tanks is minimized if the bottom of the hull is damaged.

In accordance with another aspect of the present invention, ballast tanks are provided within the space formed between the innerbottom and the tanker's hull. Prior art tankers provide ballast tanks at the same level as the cargo tanks or they use cargo tanks as ballast tanks. By arranging the cargo and ballast tanks in accordance with this aspect of the present invention, an improved trimming capability is provided because the ballast may be selectively controlled to provide positive trim for the length and breadth of at least the cargo section of the tanker.

In accordance with still another aspect of the present invention a tunnel is provided along the keel within the spacing formed between the innerbottom and the bottom of the hull. Cargo distributing pipes are run longitudinally of the hull in the tunnel and branch pipes run within the spacing or tunnel to interconnect the bottom of each cargo tank and the cargo distributing pipes. This piping arrangement insures that all the cargo, settled solids and other sediments may be discharged from the cargo tanks. Therefore, cargo deadweight may be improved and transportation costs reduced.

By connecting the branch piping to the bottom of each cargo tank, improved suction and, therefore, more efficient pumping time is provided. Further, maintenance of cargo piping is reduced because corrosion will occur only on the inside of the piping.

Still further advantages of locating the cargo distributing pipes in the tunnel are that the amount of necessary main piping is reduced and a ready access to the main piping and valves is provided.

DESCRIPTION OF SPECIFIC EMBODIMENT

Figure 1:
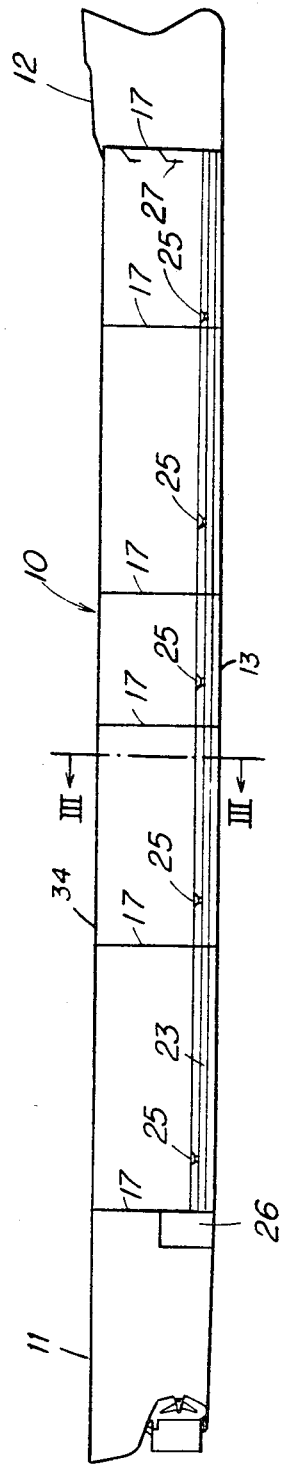
FIGURE 1 is a side view of a tanker with the starboard midship cargo section cut away.
Figure 2:
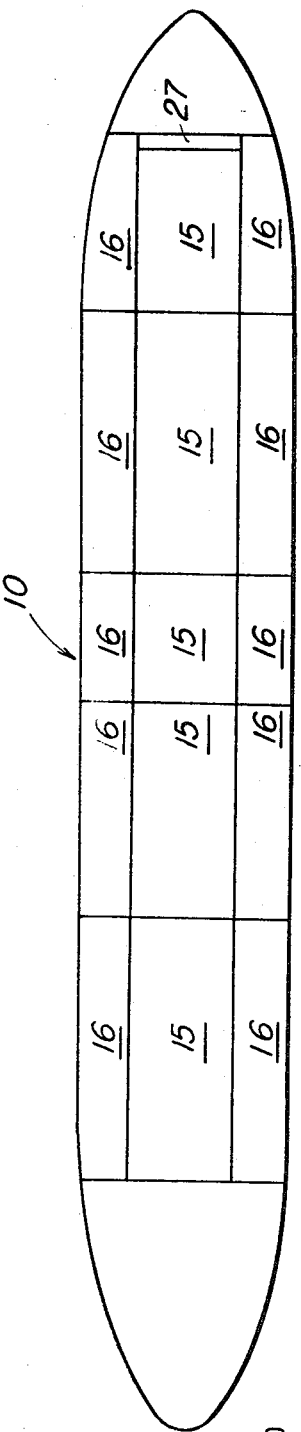
FIGURE 2 is a plan view of the tanker shown in FIGURE 1 with the top plate cut away from the midship cargo section.
Figure 3:
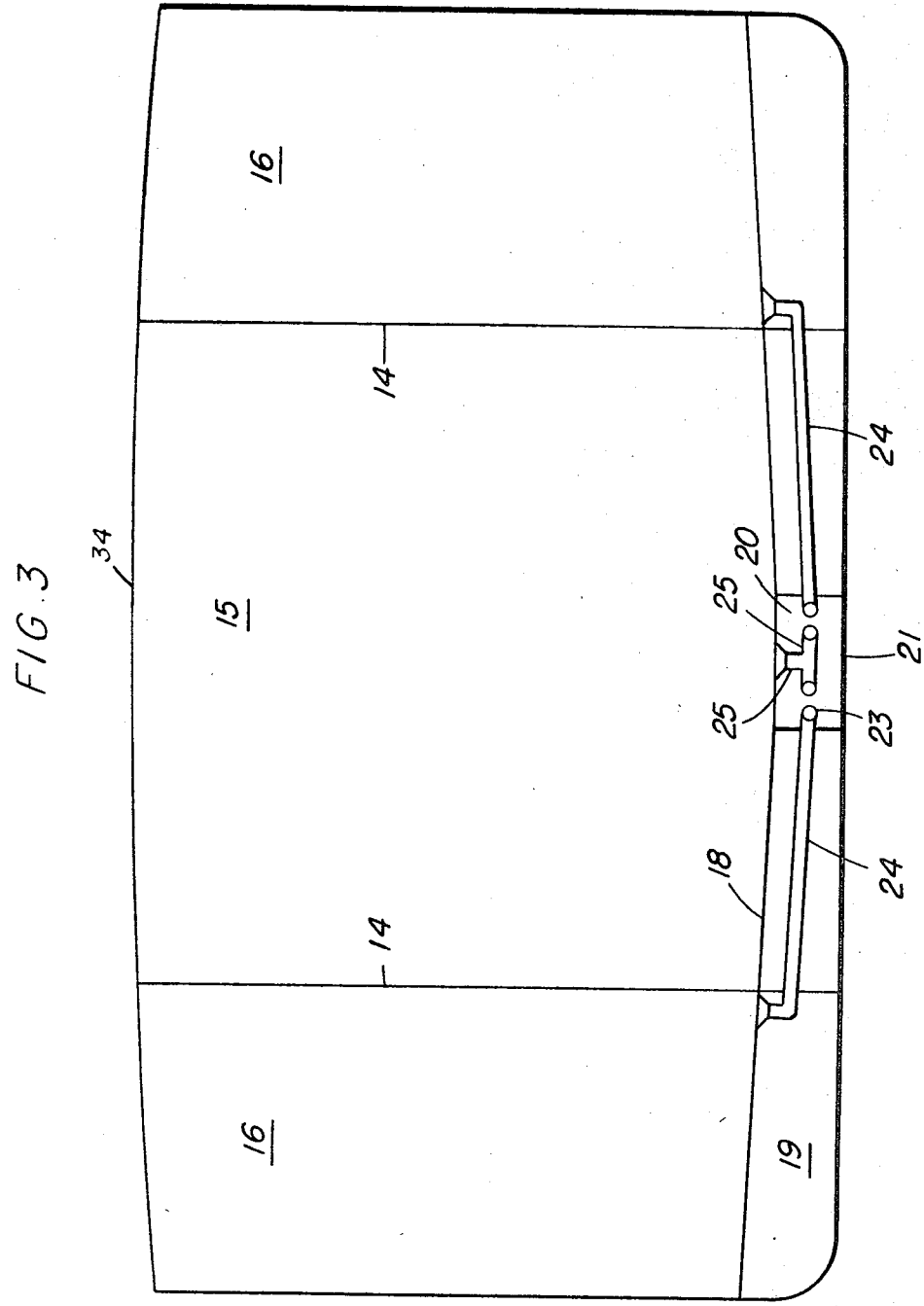
FIGURE 3 is a sectional view along the line III—III of FIGURE 1.

Referring to the drawings, a tanker hull 10 is shown having a stern section 11 and a bow section 12 interconnected by a midship cargo section 13. Two imperforated longitudinal bulkheads 14 extend at least the length of the cargo section 13. Imperforated transverse bulkheads 17 are provided to divide the cargo section 13 into a row of center cargo tanks 15 and two rows of wing tanks 16. An imperforated top plate 34 is provided to enclose the tops of the center and wing tanks 15, 16.

The longitudinal and transverse bulkheads 14, 17 may be stiffened by stiffening girders 27. To simplify the drawings, stiffening girders 27 are shown only on the transverse bulkhead forward of the forward center tank. To provide effective drainage the girders 27 preferably are sloped one inch per foot of width.

Preferably the width of wing tanks 16 are less than one half the width of the center cargo tanks 15. For example, at about midship, the center cargo tanks 15 may be about 80 feet in width and each of the wing tanks 16 may be about 37 feet in width.

An imperforated innerbottom 18 spaced from the bottom of the hull 10 extends the width of the cargo section 13 and at least the length of the cargo section 13 to form the bottom of the center and wing tanks 15, 16. The innerbottom 18 slopes upwardly from the center line of the hull 10 to both the port and the starboard sides of the hull 10 to provide a sump effect in each of the center and wing tanks 15, 16. The vertical distance between the keel and the innerbottom 18 should be at least 30 inches. The transverse bulkheads 17 and longitudinal bulkheads 14 divide the spacing formed between the innerbottom 18 and the bottom of the hull 10 into permanent ballast tanks 19. The permanent ballast tanks are provided for salt water ballast and have suitable vent pipes (not shown) and salt water piping (not shown).

A tunnel 20 runs below the inner bottom 18 along the keel 21 at least the length of the cargo section 13. Suitable access (not shown) to each of the ballast tanks 19 is provided in the tunnel 20. Cargo distributing pipes 23 are mounted within the tunnel 20 for distributing a liquid carbo such as crude oil to and from the cargo tanks 15, 16. Branch pipes 24, 25 interconnect the lowermost portion of each cargo tank 15, 16 and the cargo distributing pipes 23. The branch pipes 24 for the wing tank 15 run through the ballast tanks 19 to the underside of the wing tanks 16 and the branch pipes 25 for the center cargo tanks 15 run through the overhead portion of the tunnel 20 to the underside of the center cargo tanks 15. All piping valves (not shown) may be located in the tunnel 20.

The cargo distributing pipes 23 extend aft to a pumproom 26. Ventilation for the tunnel 20 may be provided by taking air from the forward end of the tunnel 20 and exhausting the air through the pumproom 26. Suitable lighting (not shown) may also be provided in the tunnel 20.

The tunnel 20 is preferably sufficiently large to permit removal of any section of pipe line through either the pumproom or a forward access (not shown). For example, it may be 8 feet in height and 16 feet in width. To provide a sufficient slope for drainage of the cargo tanks, the innerbottom may extend from about 8 feet above the keel to about 12 feet above the keel at the port and starboard sides of the hull.

Figure 4:
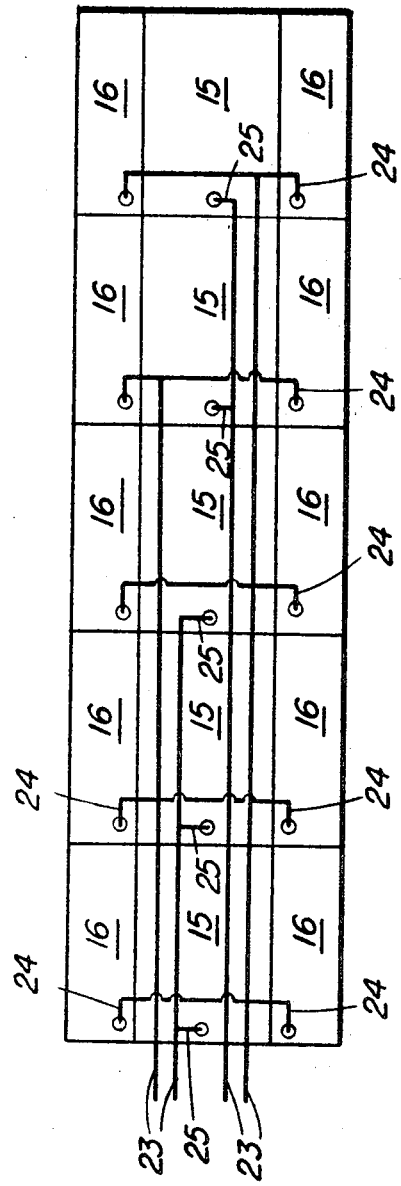
FIGURE 4 is schematic diagram of a cargo distributing pipe system.

FIGURE 4 provides a preferably schematic arrangement of the cargo distributing pipes 23 in the tunnel 20 and the branch pipes 24 running to the center 15 and wing tanks 16. This piping arrangement permits distribution of the cargo between cargo tanks 15, 16 to provide effective trimming of the tanker and also provides means for loading and unloading a variety of liquid cargoes in the wing and center tanks 15, 16. The pipe lines 23 extending to the left of FIGURE 4 are connected to the pump apparatus in the pump room 26.

Imperforate is used hereinabove and in the appended claims to describe bulkhead, overhead and deck structure as being capable of preventing cargo or ballast from passing therethrough. The thus described structure may have hatches, vent and pipe connections, and other types of accesses.

As discussed hereinabove, the broadest aspect of the present invention is to provide a space between the bottom of the cargo tanks 15, 16 and the bottom of the hull to minimize the possibility of piercing the cargo tanks 15, 16 in the event the hull 10 is damaged. It is therefore within the scope of the present invention to have the innerbottom 18 formed about the lower ends of the longitudinal and verical bulkheads 15, 17, and to provide longitudinal and/or transverse bulkheads to the extent necessary for the space formed between the innerbottom 18 and the bottom of the hull 10. It is also within the scope of the present invention to extend this space up about the sides of the hull 10.

The cargo tanks shown in the drawings and described hereinabove may be further subdivided into additional cargo tanks and any one or combination of the cargo tanks may be used as ballast tanks. Further, it is within the scope of the invention to provide only one longitudinal bulkhead to divide the cargo section into port and starboard cargo tanks.

What I claim is:

1. A tanker for transporting a liquid cargo over a body of water comprising:
   a hull formed by bottom plating means and side plating means extending fore and aft and upwardly from each of the port and starboard sides of said bottom plating means, said hull having therein a bow section, a stern section, and a midship cargo section interconnecting said bow section and said stern section,
   to plating means extending transversely of said hull to each of said side plating means and longitudinally of said hull at least the length of said midship cargo section,
   innerbottom plating means spaced from said bottom plating means and extending longtiudinally of said sull at least the length of said midshipman cargo section and transversely of said hull to each of said side plating means,
   a plurality of longitudinal bulkhead means extending at least the length of said innerbottom means from said top plating means to said bottom plating means,
   a plurality of transverse bulkhead means for dividing said midship cargo section between said top plating means and said innerbottom plating means into port and starboard imperforated wing tanks and at least one longitudinal row of imperforated center tanks, said imperforated wing and center tanks being adapted to contain and to segregate liquids,
   means for pumping liquid from said imperforated wing and center tanks,
   conduit means between said inner bottom plating means and said bottom plating means for operatively interconnecting the lowermost part of each of said imperforated tank and said pumping means, whereby said pumping means is adaptable to at least substantially empty each of said imperforated wing and center tanks,
   structure means for forming a plurality of permanent ballast tanks between said innerbottom plating means and said bottom plating means,
   means extending from said stern section for propelling said tanker through said body of water, and
   means extending from said stern section for steering said tanker.

2. A tanker for transporting a liquid cargo over a body of water comprising:
   a hull formed by bottom plating means and side plating means extending fore and aft and upwardly from each of the port and starboard sides of said bottom plating means, said hull having therein a bow section, a stern section, and a midship cargo section interconnecting said bow section and said stern section,
   top plating means extending transversely of said hull to each of said side plating means and longitudinally of said hull at least the length of said midship cargo section,
   innerbottom plating means spaced from said bottom plating means and extending longitudinally of said hull at least the length of said midship cargo section and transversely of said hull to each of said side plating means,
   a plurality of longitudinal bulkhead means extending at least the length of said midship cargo section from said top plating means to said bottom plating means,
   a plurality of transverse bulkhead means for dividing said midship cargo section between said top plating means and said innerbottom plating means into port and starboard imperforated wing tanks and at least one longitudinal row of imperforated center tanks, said imperforated center and wing tanks being adapted to contain and to segregate liquids,
   structure means for defining a longitudinally extending tunnel between said bottom plating means and said innerbottom plating means,
   means for pumping liquids from said imperforated wing and center tanks,
   a plurality of distributing pipes extending in said tunnel means from said pumping means,
   a plurality of branch pipes, each of said branch pipes extending between said bottom and innerbottom plating means and connecting the lowermost part of a different one of said imperforated wing and center tanks to one of said distributing pipes in said tunnel means, whereby said pumping means is adaptable to at least substantially empty each of said imperforated wing and center tanks,
   structure means externally of said tunnel means for forming a plurality of permanent ballast tanks between said bottom plating means and said innerbottom plating means, means extending from said stern section for propelling said tanker through said body of water, and means extending from said stern section for steering said tanker.

3. The tanker of claim 2 wherein said distributing pipes and said branch pipes are adapted to interconnect a plurality of said imperforated wing and center tanks.

4. The tanker of claim 2 wherein the bottom of each of said imperforated wing and center tanks is at least partially sloped downward toward the centerline of said hull.

5. A tanker for transporting a liquid cargo over a body of water comprising:

a hull formed by bottom plating means and side plating means extending fore and aft and upwardly from each of the port and starboard sides of said bottom plating means, said hull having therein a bow section, a stern section, and a midship cargo section interconnecting said bow section and said stern section, top plating means extending transversely of said hull to each of said side plating means and longitudinally of said hull at least the length of said midship cargo section, innerbottom plating means spaced from said bottom plating means and extending longitudinally of said hull at least the length of said midship cargo section and transversely of said hull to each of said side plating means, a plurality of longitudinal bulkhead means extending at least the length of said midship cargo section from said top plating means to said bottom plating means, a plurality of transverse bulkhead means for dividing said midship cargo section between top plating means and said innerbottom plating means into port and starboard imperforated wing tanks and at least one longitudinal row of imperforated center tanks, said imperforated center and wing tanks being adapted to contain and to segregate liquids, structure means for defining a longitudinally extending tunnel between said bottom plating means and said innerbottom plating means, structure means at one end of said tunnel means for defining a pump room, means in said pump structure means for pumping liquids from said imperforated wing and center tanks, a plurality of distributing pipes extending in said tunnel means from said pumping means, a plurality of branch pipes, each of said branch pipes extending between said bottom and inner bottom plating means and connecting the lowermost part of a different one of said imperforated wing and center tanks to one of said distributing pipes in said tunnel means, whereby said pumping means is adaptable to at least substantially empty each of said imperforated wing and center tanks, structure means externally of said tunnel means for forming a plurality of permanent ballast tanks between said bottom plating means and said innerbottom plating means, means extending from said stern section for propelling said tanker through said body of water, and means extending from said stern section for steering said tanker.

References Cited
UNITED STATES PATENTS 2,356,060 12/1967 Field et al. _____ 114—74 X
3,209,715 10/1965 Campbell et al. _____ 114—74

OTHER REFERENCES

The Society of Naval Architects and Marine Engineers Transactions, vol. 62 (1954), pp. 179–198.

MILTON BUCHLER, *Primary Examiner.*

TRYGVE M. BLIX, *Assistant Examiner.*